(12) United States Patent
Mionetto (10) Patent No.: US 7,580,204 B2
(45) Date of Patent: Aug. 25, 2009

(54) METHOD FOR MANUFACTURING LENSES, IN PARTICULAR FOR AN IMAGER COMPRISING A DIAPHRAGM

(75) Inventor: Roberto Mionetto, Tourves (FR)

(73) Assignee: STMicroelectronics Rousset SAS, Rousset (FR)

( * ) Notice: Subject to any disclaimer, the term of this patent is extended or adjusted under 35 U.S.C. 154(b) by 0 days.

(21) Appl. No.: 11/764,638

(22) Filed: Jun. 18, 2007

(65) Prior Publication Data

US 2008/0006859 A1   Jan. 10, 2008

(30) Foreign Application Priority Data

Jun. 19, 2006   (FR) .................................. 06 05475

(51) Int. Cl.
*G02B 3/08* (2006.01)
(52) U.S. Cl. ...................................... 359/742
(58) Field of Classification Search ................ 359/619, 359/620, 626, 738–740, 718, 742, 642, 724; 348/340
See application file for complete search history.

(56) References Cited

U.S. PATENT DOCUMENTS

| | | | | |
|---|---|---|---|---|
| 4,744,647 | A * | 5/1988 | Meshel et al. ................ | 351/177 |
| 4,909,818 | A * | 3/1990 | Jones ............................ | 65/31 |
| 6,898,026 | B2 * | 5/2005 | Jewers et al. ................. | 359/738 |
| 2005/0269301 | A1 | 12/2005 | Burrowes et al. | |
| 2006/0248715 | A1 * | 11/2006 | Hanada et al. ................ | 29/841 |
| 2007/0019102 | A1 * | 1/2007 | Nakajo et al. ................ | 348/340 |
| 2007/0235902 | A1 * | 10/2007 | Fleming et al. ............. | 264/400 |
| 2007/0236596 | A1 * | 10/2007 | Sekine et al. ................ | 348/340 |

FOREIGN PATENT DOCUMENTS

| | | |
|---|---|---|
| EP | 1 626 571 A1 | 2/2006 |
| WO | 96/30219 A1 | 10/1996 |
| WO | 01/89854 A1 | 11/2001 |

* cited by examiner

*Primary Examiner*—Alicia M Harrington
(74) *Attorney, Agent, or Firm*—Lisa K. Jorgenson; Robert Iannucci; Seed IP Law Group PLLC (57) ABSTRACT

A method for manufacturing a lens of a polymer material, includes producing in the core of the lens or on the surface of the latter at least one opaque zone having an optical function, by locally degrading the molecular structure of the polymer material using a beam of laser light. Example application is provided in particular but not exclusively to CMOS imagers.

25 Claims, 7 Drawing Sheets

METHOD FOR MANUFACTURING LENSES, IN PARTICULAR FOR AN IMAGER COMPRISING A DIAPHRAGM

TECHNICAL FIELD

The present disclosure generally relates to the manufacturing of optical lenses for integrated imagers and in particular but not exclusively for CMOS imagers.

BACKGROUND INFORMATION

Imagers produced according to the CMOS ("Complementary Metal Oxide Semiconductor") technology are currently the subject of an increasing number of applications due to their low cost price in comparison with CCD (Charge Coupled Device) imagers. Such CMOS imagers were initially used to produce low resolution image sensors of mediocre quality (for example web cameras). Today, after major investment in research and development, CMOS imagers can compete with CCD imagers.

Figure 1:
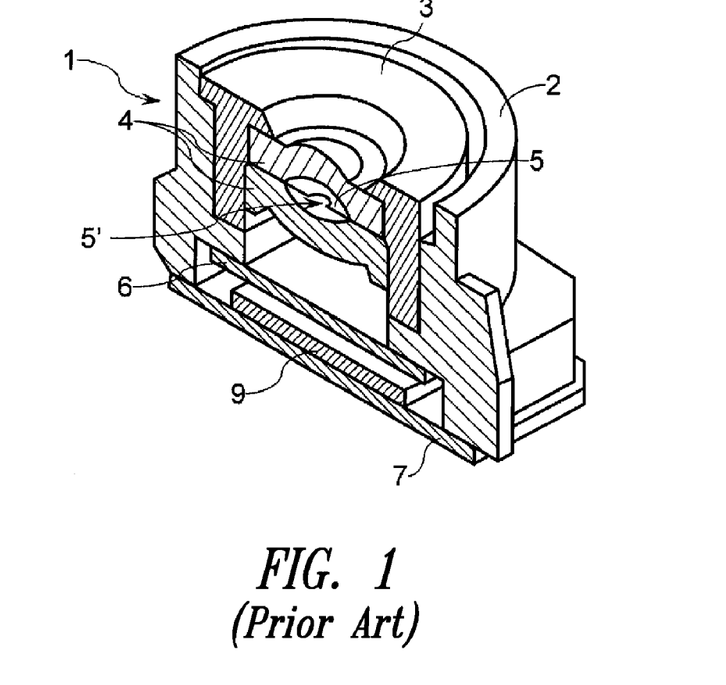
FIG. 1 described above represents a classic CMOS imager block.

FIG. 1 represents an example of a micro-module 1 for capturing images using a CMOS imager, intended for example to be mounted into a portable device such as a mobile telephone, a camera or a video camera. The micro-module 1 comprises a frame 2, a lens-holder block 3, one or more lenses 4 and a diaphragm 5 arranged in the block 3, an infrared filter 6 and a base 7. A CMOS imager 9 in the form of a semiconductor chip is disposed on the base 7 so as to receive the light passing through the lenses 4, the diaphragm 5 and the infrared filter 6.

The diaphragm 5 is generally formed by a thin opaque plastic plate having a central orifice 5' letting the light through, having a fixed diameter. The infrared filter 6 is generally a colored resin plate. It is also known to produce the infrared filter 6 by depositing, on the surface of a glass plate, dark zones (chrome deposit) forming a diffraction grating the geometry of which is determined according to the range of wavelengths to be filtered.

The CMOS imager 9 comprises a plurality of photosites each forming one pixel (not visible in FIG. 1). Each pixel comprises a photodiode and a control and interconnection circuit of the photodiode. The pixels are arranged as an array and a mosaic of red, green and blue filters is distributed over the pixel array, generally according to the Bayer architecture (the cells of a line being alternately red and green, or alternately green and blue). Each pixel is thus covered with a determined, red, green or blue, primary color filter and provides a piece of luminance information about the primary color allocated to it, forming a piece of pixel information.

Figure 2:
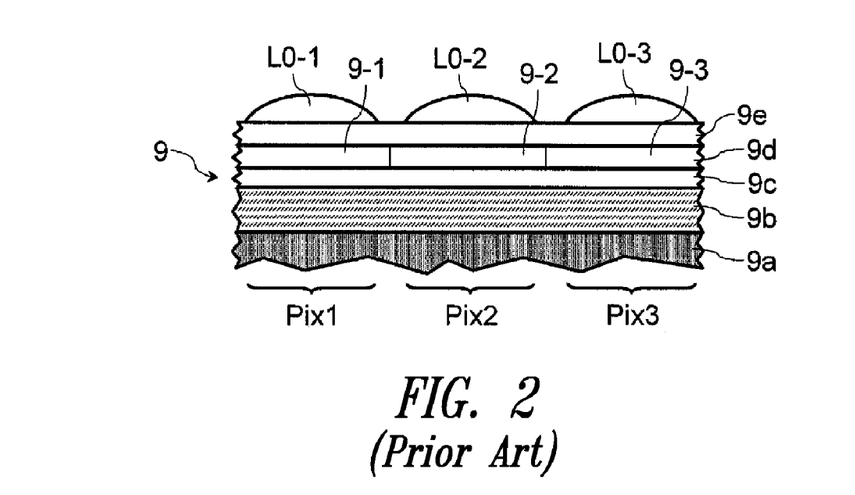
FIG. 2 described above is a cross-section of a classic CMOS imager chip.

FIG. 2 is a schematic cross-section of the imager 9 in a region corresponding to three pixels PIX1, PIX2, PIX3. Going from bottom to top, layers 9a, 9b, 9c, 9d, 9e and microlenses L0 (L0-1, L0-2, L0-3) can be distinguished. The layer 9a is a semiconductor substrate in which the imager is implanted. This layer thus comprises the active part of the imager that comprises in particular photodiodes and their associated control and interconnection circuits (not detailed). The layer 9b is formed by a dielectric material that entirely covers the substrate 9a. The layer 9c is a passivating layer deposited on the imager at the end of the CMOS manufacturing process. The layer 9d is formed by colored resins and comprises red, green or blue areas 9-1, 9-2, 9-3 forming the above-mentioned primary color filters, with one color filter per pixel. The layer 9e is an intermediate layer of resin forming a base for the microlenses L0 and providing good flatness.

The microlenses L0 are arranged in a so-called "MLA" ("Microlens Array") with one microlens per pixel.

The lens(es) 4 of the optical set are generally formed in molds by means of a polymer resin that is removed from the molds after a baking step. Another known technique of manufacturing the lenses 4 involves printing polymer resin on a base, then the resin hot creeping to obtain a convex (rounded) face.

Such a micro-module for capturing images has the disadvantage of having a relatively complex structure and of needing a considerable assembly time, increasing its cost price.

In particular, the diaphragm 5 and the infrared filter are additional components needing a dedicated production line and storing, handling and assembly steps.

BRIEF SUMMARY

An embodiment of the present invention provides a simpler micro-module structure than the classical structure that has just been described as well as a method for manufacturing a micro-module for capturing images that comprises fewer assembly steps.

One more particular embodiment of the present invention provides a diaphragm that is simpler to assemble than the classic diaphragm previously described.

An embodiment of the present invention produces a filter, in particular an infrared filter, that is simpler to assemble than the classic infrared filter previously described.

One embodiment provides a method for manufacturing a lens of a polymer material, comprising producing in or on the lens at least one opaque zone having an optical function, by locally degrading the molecular structure of the polymer material by using a beam of laser light.

According to one embodiment, the laser beam is applied to the lens by using a variable focus device comprising a wide-angle lens, enabling a distance between the zone to be degraded and a surface of the lens to be chosen.

According to one embodiment, the opaque zone forms a diaphragm.

According to one embodiment, the method comprises producing a plurality of contiguous opaque zones forming a diffraction grating having an optical filter function.

In one mode of implementation of the method, the opaque zone is produced during manufacturing the lens in which the lens has a flat face, by applying the laser beam to the flat face.

The production of the opaque zone can also be followed by rounding the flat face of the lens.

According to one embodiment, the method comprises manufacturing at least two lenses, producing at least one opaque zone in at least one of the two lenses, and assembling the two lenses to form a complex lens.

An embodiment of the present invention also relates to a method for manufacturing an integrated micro-module for capturing images, comprising: a manufacturing at least one imager on a semiconductor substrate, manufacturing at least one lens, producing in or on the lens at least one opaque zone conducted in accordance with the method according to one embodiment of the present invention, and assembling the lens directly onto the semiconductor substrate, without using any lens-holder frame.

One embodiment of the present invention also relates to a method for collectively manufacturing integrated optical micro-modules, comprising: collectively manufacturing a plurality of imagers on a semiconductor wafer, collectively manufacturing a plurality of lenses on at least one plate comprising one or more layers of polymer material and forming a lens wafer, producing at least one opaque zone in or on lenses out of the plurality of lenses, conducted in accordance with an embodiment of the method according to the present invention, assembling the lens wafer and the semiconductor wafer, so that each lens is opposite an imager, and cutting out the assembly to obtain a plurality of integrated optical micromodules.

An embodiment of the present invention also relates to a lens of a polymer material, comprising at least one opaque zone having an optical function, the opaque zone being a zone in which the polymer material has a degraded molecular structure.

According to one embodiment, the lens comprises an opaque zone having a diaphragm function.

According to one embodiment, the lens comprises a plurality of contiguous opaque zones forming a diffraction grating having an optical filter function.

According to one embodiment, the lens comprises two flat faces, one flat face and one convex or concave face, or two convex faces.

According to one embodiment, the lens comprises two layers of polymer material assembled against one another, at least one of the layers comprising at least one opaque zone having an optical function.

According to one embodiment, each layer has a convex face and the convex faces of each layer are arranged face to face to form a lenticular cavity.

An embodiment of the present invention also relates to a micro-module for capturing images, comprising an imager on a semiconductor substrate, and at least one lens according to one embodiment of the present invention.

According to one embodiment, the lens is stuck onto the imager without any lens-holder frame.

BRIEF DESCRIPTION OF THE SEVERAL VIEWS OF THE DRAWINGS

These and other features shall be presented in greater detail in the following description of one or more embodiments of the present invention, given in relation with, but not limited to the following figures, in which.

DETAILED DESCRIPTION

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

An embodiment of the present invention is in line with efforts to improve on imager technology by reducing the cost prices while still providing quality.

An embodiment of the present invention is based on the principle of using in the optical industry a technique used in prior art to produce decorative patterns in polymer objects (in particular polycarbonate).

An embodiment of the present invention provides more particularly for using a similar laser etching technique to form one or more opaque zones in or on a lens of polymer material, and thus obtain an optical function.

Figure 3A:
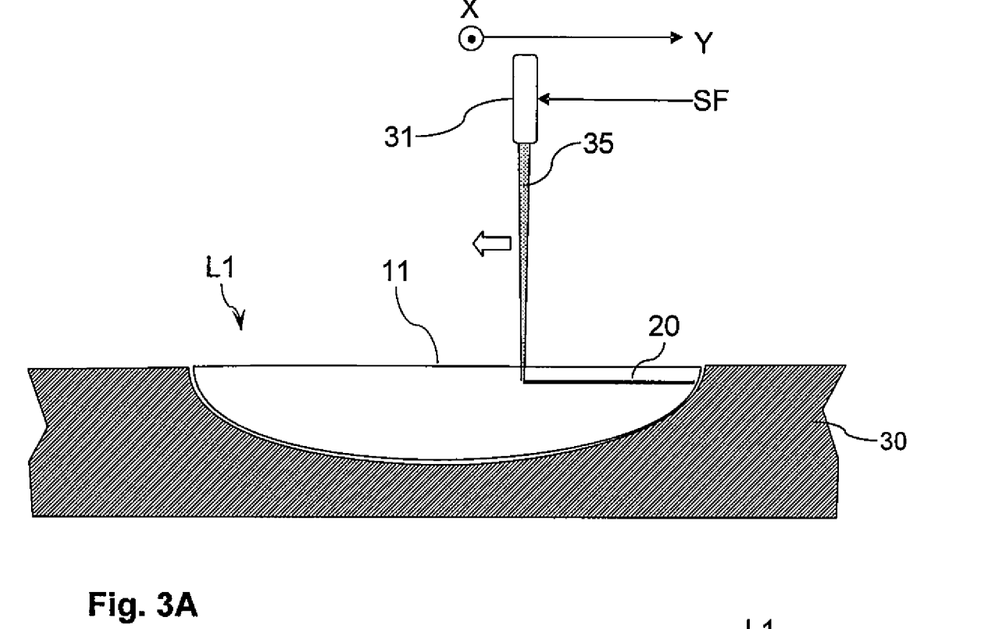
FIGS. 3A, 3B, 3C are cross-sections respectively representing a step of forming a diaphragm in a lens of planoconvex type in accordance with one embodiment of the method of the present invention, an expanded view of the opaque zone being formed, and an example of the lens obtained.
Figure 3B:
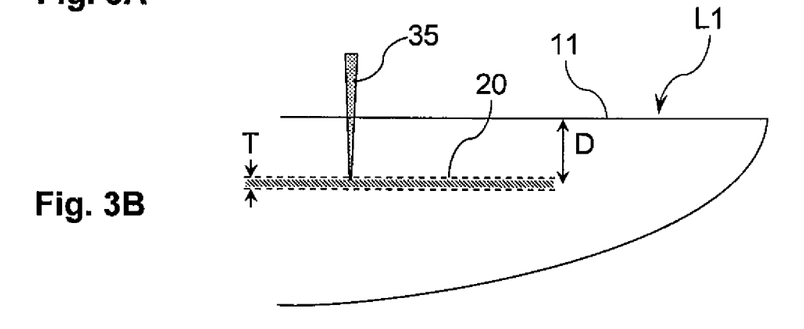
Figure 3C:
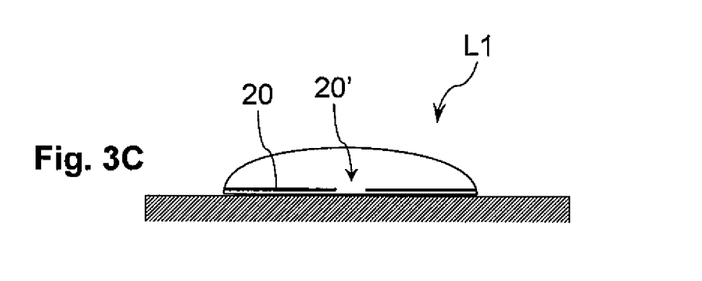

A flat diaphragm 20 is produced for example in the mass of a lens L1 of planoconvex type, under the flat face 11 thereof, as represented in FIGS. 3A, 3B, 3C. The diaphragm 20 comprises an opaque zone covering the entire surface area of the lens L1 except in a central zone 20' forming an opening to let the light through (FIG. 3C).

As shown in FIG. 3A, a laser beam 35 is applied to the lens L1, perpendicularly to the flat face 11. The lens L1 is placed on a base 30, for example the mold by means of which it has been produced. The laser 35 previously passes through a motorized focusing device 31 having a variable focal distance adjusted by an electric signal SF. The adjustment of the focal distance enables the depth of the point of impact of the laser to be controlled, e.g., the maximum energy point causing the degradation of the material constituting the lens. This material is for example polycarbonate.

A horizontal displacement in the directions X and Y of the base 30 relative to the laser beam 35 enables the entire zone 20 to be scanned so as to degrade the properties of the polymer material and to render it opaque, except in the opening region 20'. The laser 35 is for instance a femtosecond laser (laser with ultra-short pulses), for example with a 248-nm wavelength (beam not visible). One femtosecond laser pulse focuses the energy available in a short period of time, the power reached being all the more high as the pulse is short. Current femtosecond lasers reach about ten femtoseconds (one femtosecond=$10^{-15}$ s, i.e., a millionth of a billionth of a second), and a rate of 1,000 pulses per second can be reached. The advantage of a femtosecond laser is that the zone said to be thermally affected is greatly reduced, contrary to nanosecond lasers. Indeed the interaction between the laser and the material in femtosecond mode is impervious and the degradation of the material is localized. Therefore, the laser beam does not in any way alter the rest of the lens.

As shown in FIG. 3B, the degradation zone 20 thus has a low thickness T in the order of one micrometer, and is located at a distance D from the flat face of the lens L1, which can be in the order of one tenth of a millimeter to several tenths of a millimeter according to the setting of the focal distance of the focusing device 31.

Figure 4A:
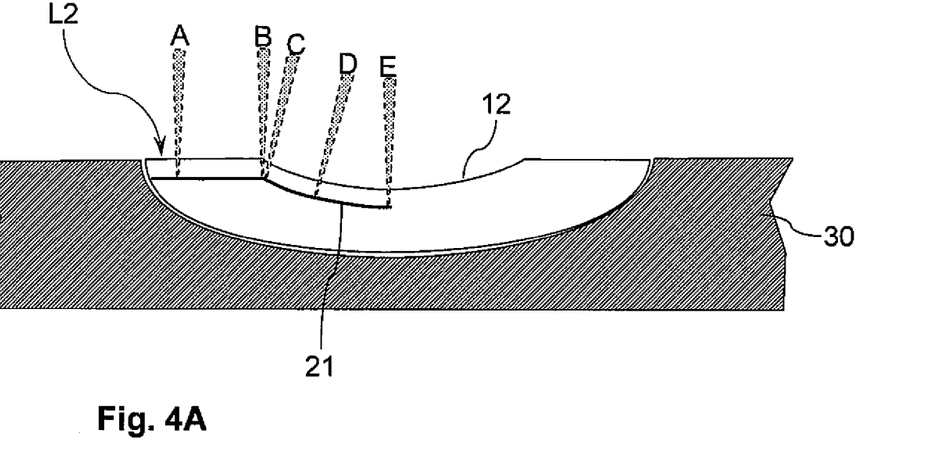
FIGS. 4A, 4B are cross-sections respectively representing a step of forming a diaphragm in a lens of convergent meniscus type in accordance with one embodiment of the method of the present invention, and an example of the lens obtained.
Figure 4B:
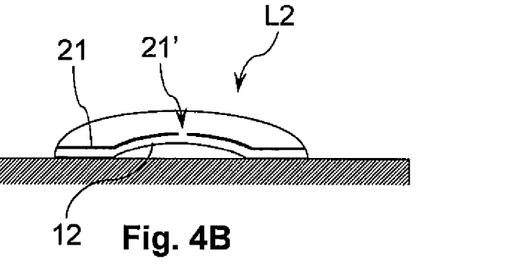

FIG. 4A shows a step of producing a concave diaphragm 21 in a lens L2 of convergent meniscus type, having a convex face and a concave face 12. The lens L2 is arranged, as above, in its mold 30 or an appropriate base. The laser beam is applied, as above, to the face 12, with an angle of incidence perpendicular to the latter. In FIG. 4A, different positions A, B, C, D, E of the laser are represented having different angles of incidence relative to a mathematical horizontal plane and corresponding to a constant angle of incidence relative to the face 12 of the lens. The final shape of the concave diaphragm 21 is represented on FIG. 4B, each part of the degraded zone being located at a constant distance from the face 12. The diaphragm has a central orifice 21' in which the polymer material has not been degraded. A flat diaphragm can also be produced by providing a control of the focal distance of the focusing device 31 according to the position of the laser on the concave face 12.

Figure 5:
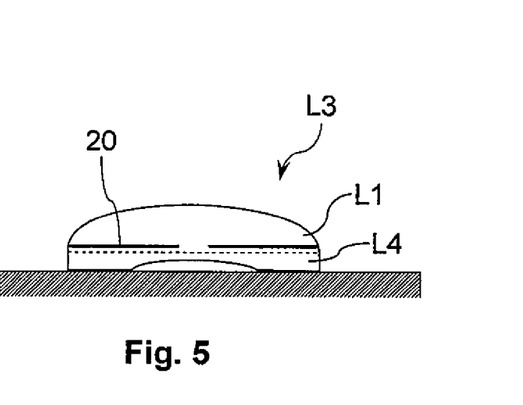
FIG. 5 is a cross-section of another example of a lens comprising a diaphragm according to one embodiment of the present invention.

FIG. 5 is a cross-section of a lens L3 of convergent meniscus type comprising the flat diaphragm 20 already described. The lens is formed by assembling the planoconvex lens L1 already described, equipped with the diaphragm 20, and a lens L4 of planoconcave type. The lenses L1, L4 are assembled by sticking the flat face of the lens L4 onto the flat face of the lens L1, by using a thin layer of glue (e.g., epoxy, urethane, silicone, etc.) having an optical index identical or close to the polymer material forming the lenses L1, L4.

Figure 6A:
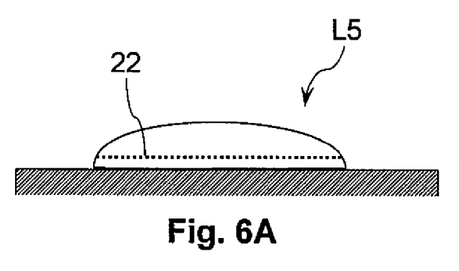
FIGS. 6A, 6B are cross-sections of a lens of planoconvex type and of a lens of convergent meniscus type each comprising an infrared filter according to an embodiment of the present invention.
Figure 6B:
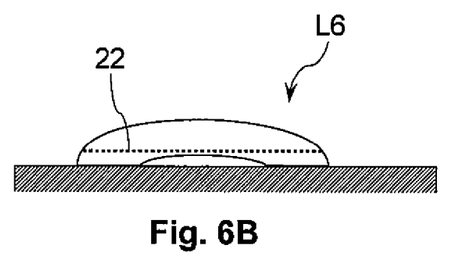

Generally speaking, an embodiment of the method according to the present invention makes it possible to produce in or on a lens any optical function which can be obtained by rendering the material locally opaque. For example, a diffraction grating 22 is produced in a lens L5 of planoconvex type represented in FIG. 6A and in a lens L6 of convergent meniscus type represented in FIG. 6B. The grating 22 comprises a plurality of parallel and contiguous opaque zones obtained as above by localized degradation of the polymer material. The grating forms an interference filter with one or more narrow or wide bandwidths, for example a wide-band filter covering the infrared region.

Figure 7A:
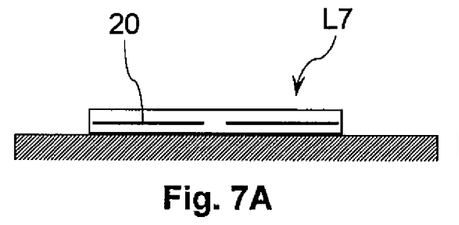
FIGS. 7A, 7B are cross-sections of a parallel face plate comprising a diaphragm according to an embodiment of the present invention and of a parallel face plate comprising an infrared filter according to an embodiment of the present invention.
Figure 7B:
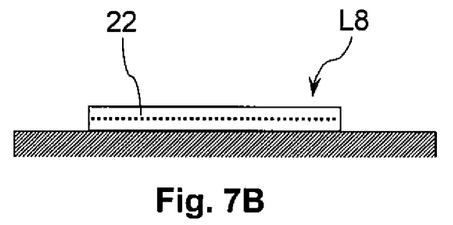

The term "lens" is used here in its most general sense and includes parallel plates. Thus, FIG. 7A represents a parallel plate L7 made of a polymer material in which the flat diaphragm 20 has been formed and FIG. 7B represents a parallel plate L8 in which the diffraction grating 22 has been formed.

Figure 8:
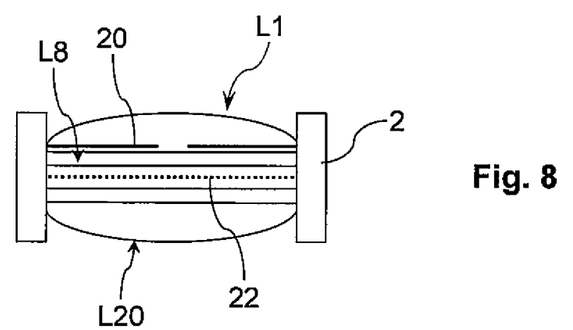
FIGS. 8 and 9 represent examples of assemblies of lenses according to one or more embodiments of the present invention.
Figure 9:
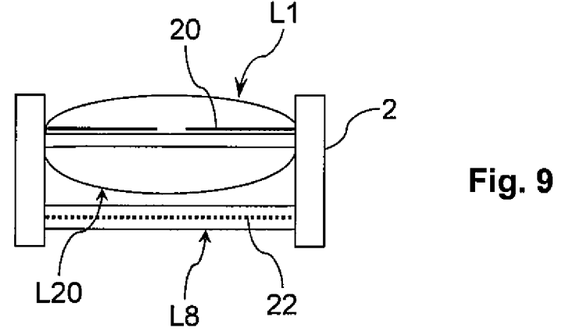

As represented in FIGS. 8 and 9, assemblies of lenses according to an embodiment of the present invention enable optical sets with a structure simpler than in prior art to be produced. In FIG. 8, the frame 2 of a micro-module for capturing images receives the lens L1 equipped with its integrated diaphragm 20, a classic lens L20 of planoconvex type, and the parallel plate L8 equipped with its integrated diffraction grating 22. The plate L8 is sandwiched between the flat faces of the lenses L1, L20. In FIG. 9, the lenses L1 and L20 are arranged face to face and the plate L8 is arranged under the convex face of the lens L20.

FIGS. 10, 11A, 11B, 12 show a method for manufacturing micro-modules for capturing images by assembling a silicon wafer comprising a plurality of imagers and a "lens wafer" comprising a plurality of lenses.

Figure 10:
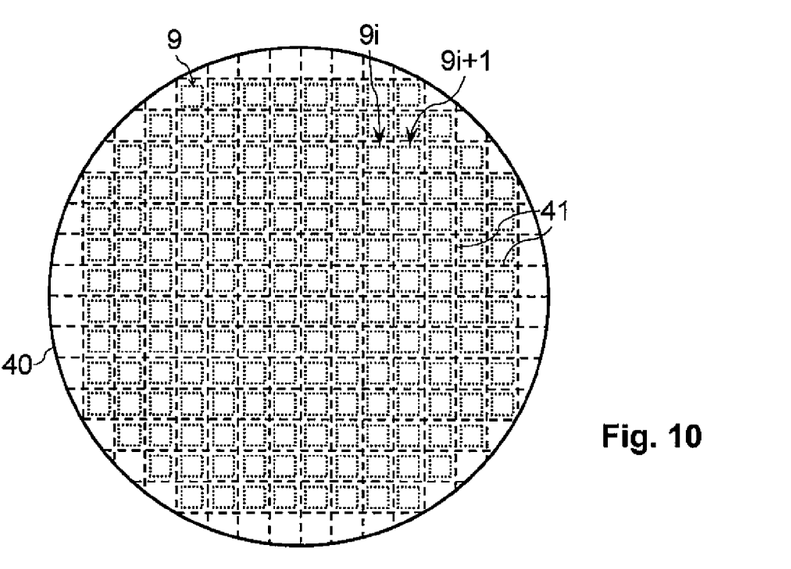
FIG. 10 is a top view of an embodiment of a semiconductor wafer comprising imagers.

FIG. 10 is a view of the front face of a silicon wafer 40 comprising a plurality of active regions 9 ($9i$, $9i+1$, etc.) each forming an imager such as the one represented in FIG. 2. The imagers 9 have been produced collectively on the wafer using the techniques of microelectronics, in particular in one embodiment by implantation of dopants, deposit and/or growth of oxide and deposit and/or growth of various materials (e.g., metal, polysilicon, dielectric material, passivation material, colored resin deposit (microlenses), etc.).

In prior art, the wafer 40 is cut into chips each comprising an imager, and the chips are then assembled in optical sets as described in the preamble. This operation of cutting the wafer into "dice", or singulation, is generally performed with a diamond slitting wheel, by following scribe lines 41 represented in dotted lines and forming a grid on the surface of the wafer.

According to one embodiment of the present invention, the assembly of the imagers with lenses is performed before cutting the wafer 40. For this purpose, lenses L9 (L$9i$, L$9i+1$, etc.), here of biconvex type, are produced collectively on the front face of a transparent plate 50 to obtain the "lens wafer" 55 seen in a cross-section in FIG. 11A and from above in FIG. 11B. The lenses L9 are disposed on the plate 50 according to an array arrangement (in lines and in columns) having a spacing identical to that of the imagers of the wafer 40, and having identical scribe lines 41.

Figure 12:
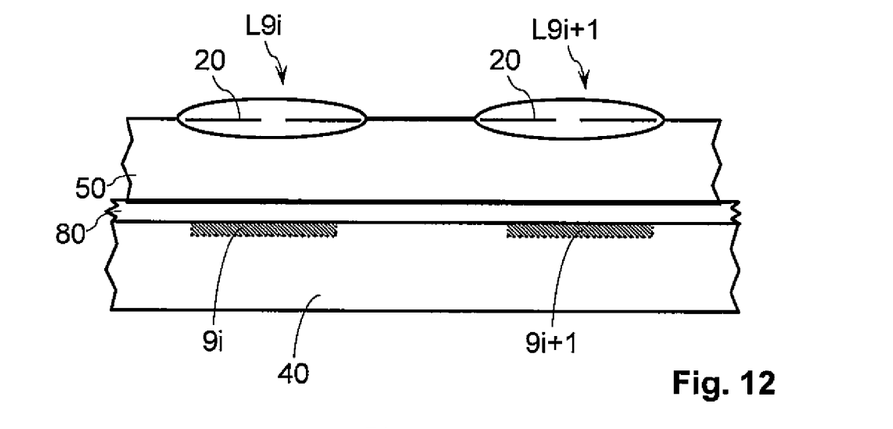
FIG. 12 is a cross-section of an embodiment of an assembly of the imager wafer in FIG. 10 and of the lens wafer in FIGS. 11A, 11B, FIGS. 13A to 13E are cross-sections showing steps of manufacturing the lens wafer according to an embodiment.

As represented in FIG. 12, the lens wafer 55 is then assembled onto the imager wafer 40 by sticking the rear face of the plate 50 onto the front face of the wafer 40 by means of a layer of glue 80 (e.g., epoxy, urethane, silicon, etc.) and by centering each lens L9 on an imager 9 of corresponding array rank.

The assembly formed by the wafer 40 and the lens wafer 50 is then cut into individual chips, by following the scribe lines 41. Each chip thus obtained forms an integrated module for capturing images, comprising an imager and its associated lens. The step of singulating two wafers is for example performed with a diamond slitting wheel, by following scribe lines 41.

Figure 11A:
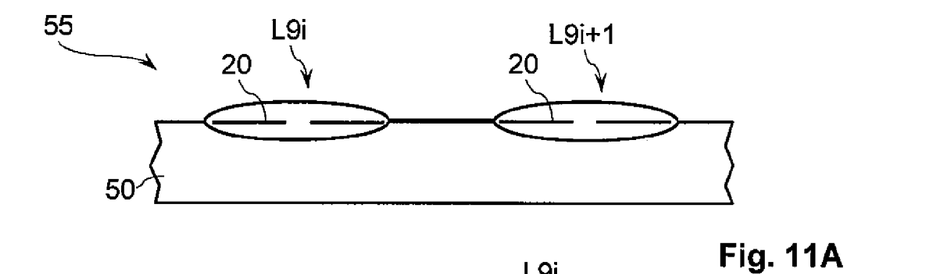
FIGS. 11A, 11B are a cross-section and a top view of a lens wafer comprising lenses according to an embodiment of the present invention.
Figure 11B:
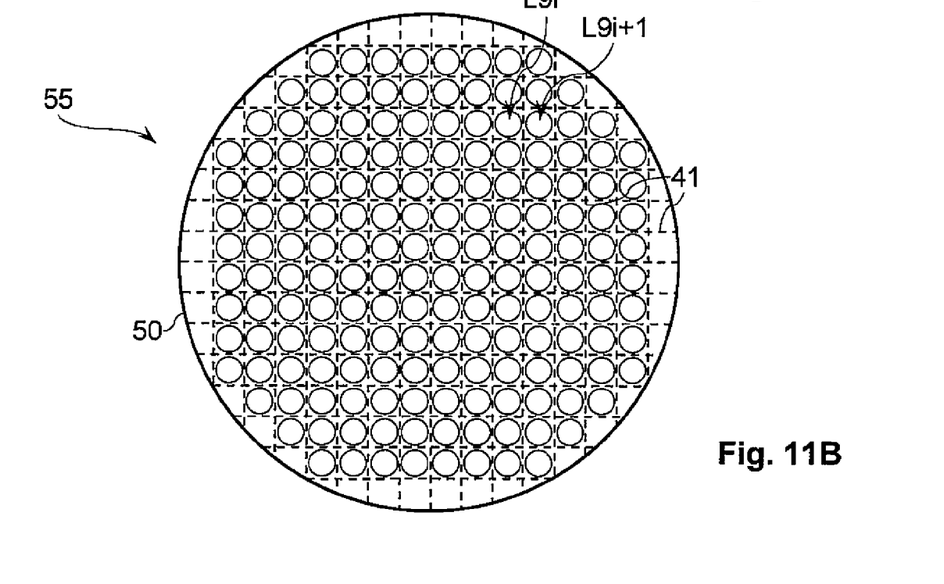

As it can be seen in FIGS. 11A, and 12, each lens L9 of the lens wafer comprises a diaphragm 20 produced in accordance with an embodiment of the method of the present invention.

FIGS. 13A to 13E show an example of an embodiment of a method for manufacturing the lenses L9, including a step of forming the diaphragm 20.

Figure 13A:
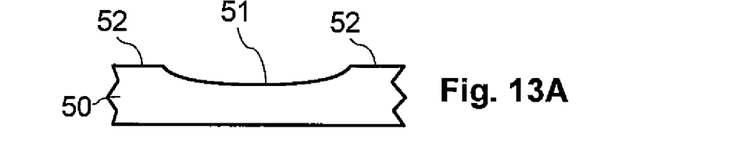

The plate 50 is formed in a mold using a transparent polymer resin and is removed from the mold after a step of baking.

The mold is formed so that the front face of the plate 50 (after the plate has been turned over) has cups 51 separated by flat zones 52 corresponding to the scribe lines, as represented in FIG. 13A.

Figure 13B:
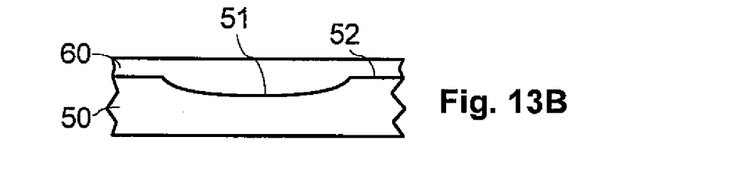

During a step shown in FIG. 13B, the front face of the plate 50 is covered with a layer 60 of light-sensitive transparent polymer resin, deposited in liquid form, spread by spin coating then subjected to a baking step.

Figure 13C:
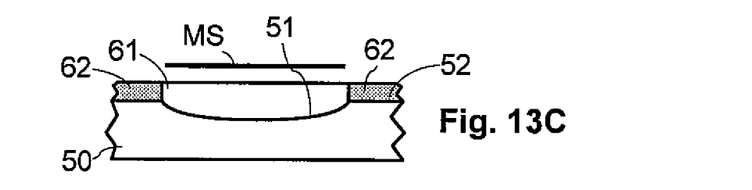

During a step shown in FIG. 13C, the layer of resin 60 is exposed to an ultraviolet light with interposition of an insulation mask MS that protects zones 61 of the layer 60 located above the cups 51 from the light, while zones 62 located above the zones 52 of the plate 50 are exposed to the light.

The exposed zones 62 are then removed with an organic solvent, to obtain a planoconvex array of pads 61 the lower face of which has a convex shape corresponding to the concave shape of the cups 51.

Figure 13D:
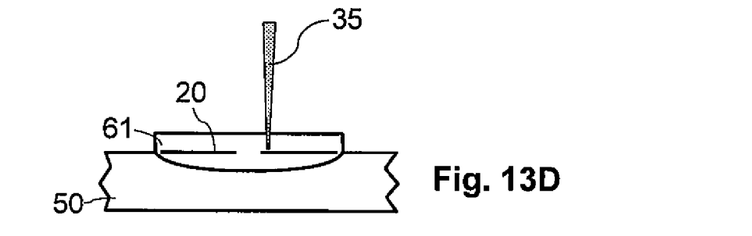

During a step shown in FIG. 13D, a diaphragm 20 is produced in each lens 61, by using the laser 35 and by passing through the flat face of each lens, as described above in relation with FIGS. 3A, 3B.

Figure 13E:
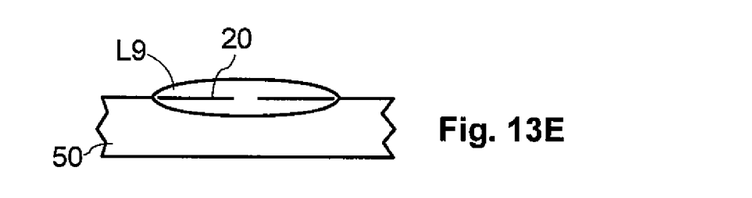

During a step shown in FIG. 13E, the planoconvex lenses 61 are subjected to a determined temperature to undergo a thermal creep that transforms their flat front face into a convex face, so that the biconvex lenses L9 are obtained. They are then hardened by a final operation of annealing.

Figure 14A:
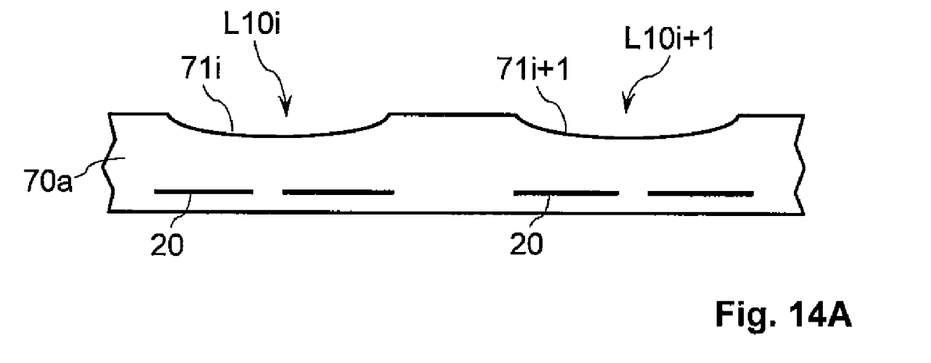
FIGS. 14A, 14B are cross-sections of two lens wafers according to an embodiment of the present invention.
Figure 14B:
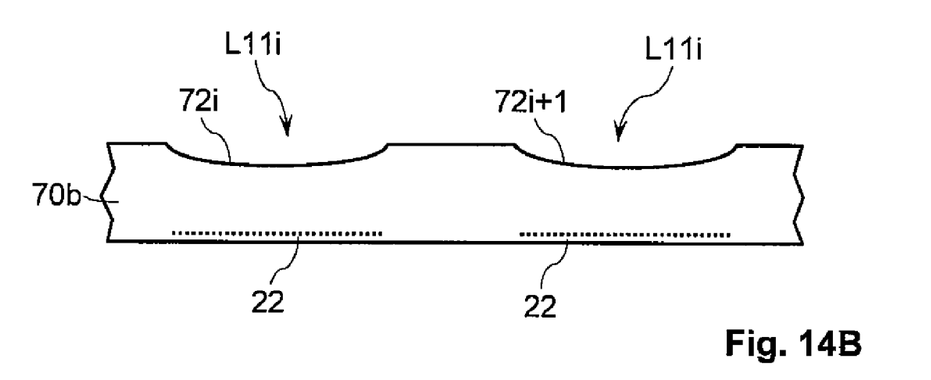
Figure 15:
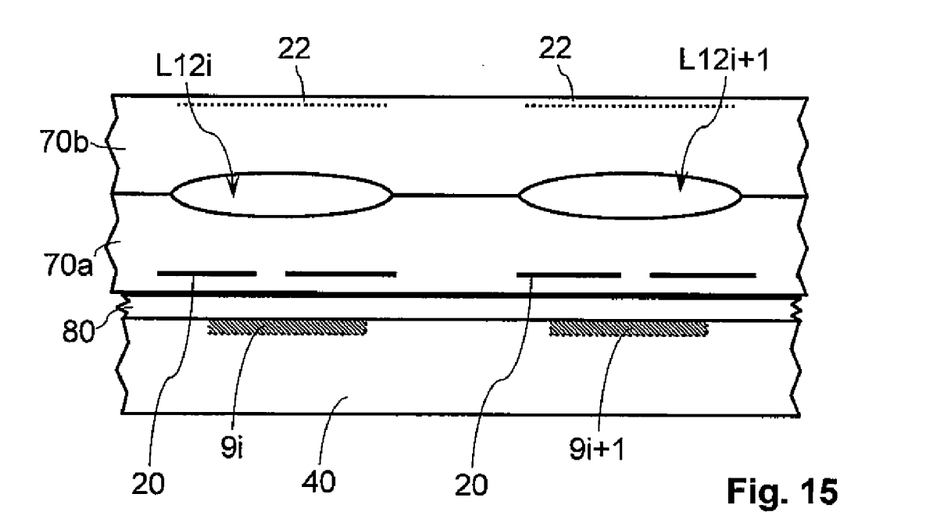
FIG. 15 is a cross-section of an assembly of the semiconductor wafer in FIG. 10 and of the lens wafers represented in FIGS. 14A, 14B according to an embodiment.

FIGS. 14A, 14B and 15 represent another embodiment of a lens wafer to be stuck onto the imager wafer 40 (FIG. 10). The lens wafer is here produced by assembling two lens plates 70a, 70b respectively represented in FIGS. 14A and 14B.

The plate 70a has been formed in a mold using a transparent polymer resin and has been removed from the mold after a baking step. The front face of the plate 70a has cups 71 (71i, 71i+1 . . . ) separated by flat zones corresponding to the scribe lines. The rear face of the plate 70a is flat and forms with each cup 71 (71i, 71i+1 . . . ) a lens L10 of planoconcave type (L10i, L10i+1 . . . ). Inside each lens L10 a diaphragm 20 according to an embodiment of the present invention has been produced, by applying a laser to the rear face. The diaphragm 20 of each lens is thus located on the rear face of the plate 70a, below each cup 71.

The plate 70b has also been formed in a mold by using transparent polymer resin and its front face also has cups 72 (72i, 72i+1 . . . ) separated by flat zones corresponding to the scribe lines. Although represented here identical to the cups 71, the cups 72 have a curvature that is not necessarily identical to that of the cups 71 and which is determined by the designer according to the optical properties desired for the lens wafer. The rear face of the plate 70b is flat and forms with each cup 72 a lens L11 of planoconcave type (L11i, L11i+1 . . . ). Inside each lens L11 a diffraction grating 22 has been produced according to an embodiment of the present invention forming an infrared filter, by applying a laser to the rear face. The infrared filter 22 of each lens is thus located on the rear face of the plate 70b, below each cup 72.

Each plate 70a, 70b has an optical index chosen according to the optical properties desired for the lenses to be produced.

As shown in FIG. 15, the two plates 70a, 70b are assembled against one another, each lens L10 of the plate 70a being disposed opposite a lens L11 of the plate 70b, so as to delimit cavities of lenticular shape L12 (L12i, L12i+1 . . . ). The two plates 70a, 70b are fixed to each other by an appropriate technique, such as by use of a transparent glue.

Prior to fixing the plates 70a, 70b, the lenticular cavities can be filled with a transparent material having an optical index chosen according to the optical properties desired for the lenses.

Once assembled, the plates 70a, 70b are fixed onto the wafer 40 with a layer of transparent glue 80, as above. The thickness of the layer of glue is sufficient to prevent the plate 70b from being in contact with the microlenses of the imagers. The layer of glue 80 is for example deposited by spin coating.

The plate 70a can also be assembled onto the wafer 40 before being assembled with the plate 70b.

As above, the assembly formed by the wafer 40 and the plates 70a, 70b is then cut into individual chips each forming an integrated module for capturing images.

It will be understood by those skilled in the art that various other alternative embodiments of the method according to the present invention may be made. The examples of lens wafers described above point to many other embodiments of lenses. It is possible for example to assemble several transparent plates to obtain a combination of complex lenses. Also, the opaque zone is not necessarily produced in depth, as described above, and can be produced on the surface, by focusing the laser beam on the surface of the lens.

It will also be understood by those skilled in the art that various applications of embodiments of the present invention are possible. Thus, one or more embodiments of the present invention does not only apply to CMOS imagers, but more generally to any imager comprising an integrated image sensor on a semiconductor wafer, such as CCD imagers.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for manufacturing a lens of a polymer material, the method comprising:
   producing in or on the lens at least one opaque zone having an optical function,
   wherein said at least one opaque zone is made opaque by locally degrading a molecular structure of the polymer material at said at least one opaque zone using a beam of laser light, and
   wherein said at least one opaque zone, of the lens thus obtained, includes the polymer material having said degraded molecular structure, wherein said at least one opaque zone is located within said lens at a distance from a surface of said lens.

2. The method according to claim 1 wherein the laser beam is applied to the lens using a variable focus device comprising a wide-angle lens, enabling a distance between a zone to be degraded and a surface of the lens to be chosen.

3. The method according to claim 1 wherein the at least one opaque zone forms a diaphragm.

4. The method according to claim 1, further comprising producing a plurality of contiguous opaque zones forming a diffraction grating having an optical filter function.

5. The method according to claim 1 wherein the at least one opaque zone is produced during manufacturing the lens in which the lens has a flat face, by applying the laser beam to the flat face.

6. The method according to claim 5 wherein the production of the at least one opaque zone is followed by rounding the flat face of the lens.

7. The method according to claim 1, comprising manufacturing at least two lenses, producing at least one opaque zone in at least one of the two lenses, and assembling the two lenses to form a complex lens.

8. A method for manufacturing an integrated micro-module for capturing images, the method comprising:
   manufacturing at least one imager on a semiconductor substrate;
   manufacturing at least one lens;
   producing in or on the lens at least one opaque zone in accordance with the method according to claim 1; and
   assembling the lens directly onto the semiconductor substrate, without using any lens-holder frame.

9. A method for collectively manufacturing integrated optical micro-modules, the method comprising:
   collectively manufacturing a plurality of imagers on a semiconductor wafer;
   collectively manufacturing a plurality of lenses on at least one plate having one or more layers of polymer material and forming a lens wafer;
   producing at least one opaque zone in or on lenses out of the plurality of lenses, in accordance with the method according to claim 1;
   assembling the lens wafer and the semiconductor wafer, so that each lens is opposite an imager; and
   cutting out the assembly to obtain a plurality of integrated optical micro-modules.

10. A formed lens of a polymer material, the lens comprising at least one opaque zone having an optical function, the at least one zone being a zone made of said polymer material, which has a degraded molecular structure at said zone, so as to render said zone opaque in said formed lens, wherein said at least one opaque zone is located within said lens at a distance from a surface of said lens.

11. The lens according to claim 10 wherein said at least one opaque zone has a diaphragm function.

12. The lens according to claim 10, further comprising a plurality of contiguous opaque zones forming a diffraction grating having an optical filter function.

13. The lens according to claim 10, further comprising two flat faces.

14. The lens according to claim 10, further comprising a flat face and a convex or concave face.

15. The lens according to claim 10, further comprising two convex faces.

16. The lens according to claim 10, comprising two layers of polymer material assembled against one another, at least one of the layers having said at least one opaque zone having said optical function.

17. A micro-module for capturing images, the micro-module comprising an imager on a semiconductor substrate, and at least one lens according to claim 10.

18. The micro-module according to claim 17 wherein the lens is stuck onto the imager without any lens-holder frame.

19. A formed lens of a polymer material, the lens comprising at least one opaque zone having an optical function, the at least one opaque zone being a zone made of said polymer material, which has a degraded molecular structure at said zone, so as to render said zone opaque in said formed lens, the lens including two layers of polymer material assembled against one another, at least one of the layers having said at least one opaque zone having said optical function, wherein each layer has a convex face and the convex faces of each layer are arranged face to face to form a lenticular cavity.

20. An apparatus, comprising:
   an imaging device having a micro-module to capture images, the micro-module including:
   an imager on a semiconductor substrate; and
   at least one lens made of a polymer material, said at least one lens having:
   (a) at least one opaque zone that includes said polymer material, which has a degraded molecular structure at said zone so as to render said zone opaque, and
   (b) a region different from said at least one opaque zone, wherein in said region said polymer material maintains said molecular structure to allow light to pass through said region, said at least one opaque zone having an optical function, wherein said at least one opaque zone is located within said lens at a distance from a surface of said lens.

21. The apparatus of claim 20 wherein said imaging device is a web camera, video camera, cellular telephone, or digital camera.

22. The apparatus of claim 20 wherein said imager is a complementary metal oxide semiconductor (CMOS) imager.

23. The apparatus of claim 20 wherein said at least one opaque zone is located on a surface of said lens.

24. The apparatus of claim 20 wherein said optical function is a diaphragm function.

25. The apparatus of claim 20 wherein said at least one opaque zone includes a plurality of contiguous ones of said at least one opaque zone, said plurality forming a diffraction grating that provides said optical function as an optical filter function.

* * * * *